(12) United States Patent
Toohy et al.

(10) Patent No.: US 11,199,210 B2
(45) Date of Patent: Dec. 14, 2021

(54) SELF-RETAINING SPACER AND CLIP DEVICE

(71) Applicant: GM GLOBAL TECHNOLOGY OPERATIONS LLC, Detroit, MI (US)

(72) Inventors: Charles W. Toohy, Waterford, MI (US); Charles E. Jensen, Shelby Township, MI (US); Tyler A. Riley, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 16/741,230

(22) Filed: Jan. 13, 2020

(65) Prior Publication Data

US 2021/0215178 A1   Jul. 15, 2021

(51) Int. Cl.
  *F16B 5/06*  (2006.01)
  *H01M 2/00*  (2006.01)
  *H01M 50/20* (2021.01)
(52) U.S. Cl.
  CPC ............. *F16B 5/065* (2013.01); *H01M 50/20* (2021.01)
(58) Field of Classification Search
  CPC ..... H01M 50/20; F16B 5/0685; F16B 5/0692; F16B 5/0635; F16B 5/065; F16B 37/041; F16B 5/025; Y10T 24/3448; Y10T 24/3427; Y10T 24/346; Y10T 24/42; Y10T 24/47; Y10T 24/4727; Y10T 24/23; Y10S 411/97
  See application file for complete search history.

(56) References Cited

U.S. PATENT DOCUMENTS

| 3,971,107 | A  | * | 7/1976  | Yim    | B60J 7/104 |
|           |    |   |         |        | 24/569     |
| 2007/0243038 | A1 | * | 10/2007 | Rausch | F16B 37/041 |
|           |    |   |         |        | 411/91     |
| 2015/0303421 | A1 | * | 10/2015 | Tazawa | H01M 50/20 |
|           |    |   |         |        | 429/99     |
| 2019/0078596 | A1 | * | 3/2019  | Yoyasu | F16B 2/22  |

\* cited by examiner

*Primary Examiner* — Jack W Lavinder
(74) *Attorney, Agent, or Firm* — Quinn IP Law

(57) ABSTRACT

A spacer and clip device includes a body including a clip portion and a spacer portion separated by a channel edge defining a channel extending longitudinally through the body, the clip portion and the spacer portion connected by a joining portion. The body includes an attachment edge defining an attachment opening that extends laterally through the body, the spacer portion establishes a standoff height, and the body is compressible to adjust the standoff height.

11 Claims, 4 Drawing Sheets

SELF-RETAINING SPACER AND CLIP DEVICE

INTRODUCTION

The present disclosure relates generally to a self-retaining spacer and clip device that is self-retaining and can be used to set a seal height and removably join two components.

Current spacer designs are typically fixedly attached between two components. Additionally, these designs do not include removability and adjustable standoff height adjustment.

SUMMARY

Embodiments according to the present disclosure provide a number of advantages. For example, embodiments according to the present disclosure include a self-retained clip and spacer device that is configured to receive a mechanical fastener to both removably couple two components and set a standoff height between the two components.

In one aspect of the present disclosure, a spacer and clip device includes a body having a first end and a second end longitudinally opposite the first end. The body includes a channel edge defining a channel extending longitudinally through the body, the channel dividing the body into a clip portion and a spacer portion, the clip portion having a first edge, a second edge spaced apart from and parallel to the first edge, a curved edge connecting the first and second edges at the first end of the body, and a third edge connecting the first and second edges at the second end of the body with an upper clip surface defined by the first, second, third, and curved edges and the spacer portion having a side surface, a lower surface, and an upper spacer surface, and an attachment edge defining an attachment opening that extends laterally through the clip and spacer portions of the body. The spacer portion establishes a standoff height and the body is compressible to adjust the standoff height.

In some aspects, the spacer and clip device further includes a retention member extending from the clip portion of the body into the channel.

In some aspects, the clip portion and the spacer portion are coupled together by a joining portion.

In some aspects, the joining portion extends from the upper clip surface to the lower surface of the spacer portion.

In some aspects, the channel extends from the first end of the body to the second end of the body but does not bisect the body.

In some aspects, the upper spacer surface of the spacer portion extends from the first end of the body to the second end of the body.

In some aspects, both the upper clip surface of the clip portion and the upper spacer surface of the spacer portion extend to a lateral plane positioned at the first end of the body.

In some aspects, the spacer portion includes a first face surface, a second face surface, and a receiving surface that truncate the spacer portion such that the upper spacer surface does not extend to a lateral plane positioned at the first end of the body.

In some aspects, the receiving surface aligns with the attachment opening in the body.

In another aspect of the present disclosure, a spacer and clip device includes a body including a clip portion and a spacer portion separated by a channel edge defining a channel extending longitudinally through the body, the clip portion and the spacer portion connected by a joining portion. The body includes an attachment edge defining an attachment opening that extends laterally through the body, the spacer portion establishes a standoff height, and the body is compressible to adjust the standoff height.

In some aspects, the spacer and clip device further includes a retention member extending from the clip portion of the body into the channel.

In some aspects, the channel extends from a first end of the body to a second end of the body but does not bisect the body.

In some aspects, the spacer portion includes an upper spacer surface that extends longitudinally from a first end of the body to a second end of the body.

In some aspects, the clip portion includes an upper clip surface that extends longitudinally from the first end of the body to the second end of the body.

In some aspects, both the upper clip surface of the clip portion and the upper spacer surface of the spacer portion extend to a lateral plane positioned at the first end of the body.

In some aspects, the spacer portion includes a first face surface, a second face surface, a receiving surface, and an upper spacer surface perpendicular to each of the first face, the second face, and the receiving surfaces, the first face, second face, and receiving surfaces truncating the spacer portion such that the upper spacer surface does not extend to a lateral plane positioned at the first end of the body.

In some aspects, the receiving surface aligns with the attachment opening in the body.

In another aspect of the present disclosure, a battery tray assembly includes a cover member, a battery tray, a sealing member positioned between the cover member and the battery tray, a spacer and clip device including a body having a first end and a second end longitudinally opposite the first end, the body including a clip portion and a spacer portion separated by a channel edge defining a channel extending longitudinally through the body, the clip portion and the spacer portion connected by a joining portion, the body including an attachment edge defining an attachment opening that extends laterally through both of the clip portion and the spacer portion, and a mechanical fastener. The mechanical fastener extends through the attachment opening in the spacer and clip device to removably couple the cover member and the battery tray, the clip portion of the spacer and clip device extends over an outward surface of the cover member, and the spacer portion of the spacer and clip device is adjacent to the sealing member and establishes a spacing between the cover member and the battery tray.

In some aspects, the clip portion includes an upper clip surface and the spacer portion includes an upper spacer surface and both of the upper clip surface and the upper spacer surface extend to a lateral plane positioned at the first end of the body.

In some aspects, the spacer portion includes a first face surface, a second face surface, a receiving surface, and an upper spacer surface perpendicular to each of the first face, second face, and receiving surfaces, the first face, second face, and receiving surfaces truncating the spacer portion such that the upper spacer surface does not extend to a lateral plane positioned at the first end of the body.

BRIEF DESCRIPTION OF THE DRAWINGS

The present disclosure will be described in conjunction with the following figures, wherein like numerals denote like elements.

Figure 1:
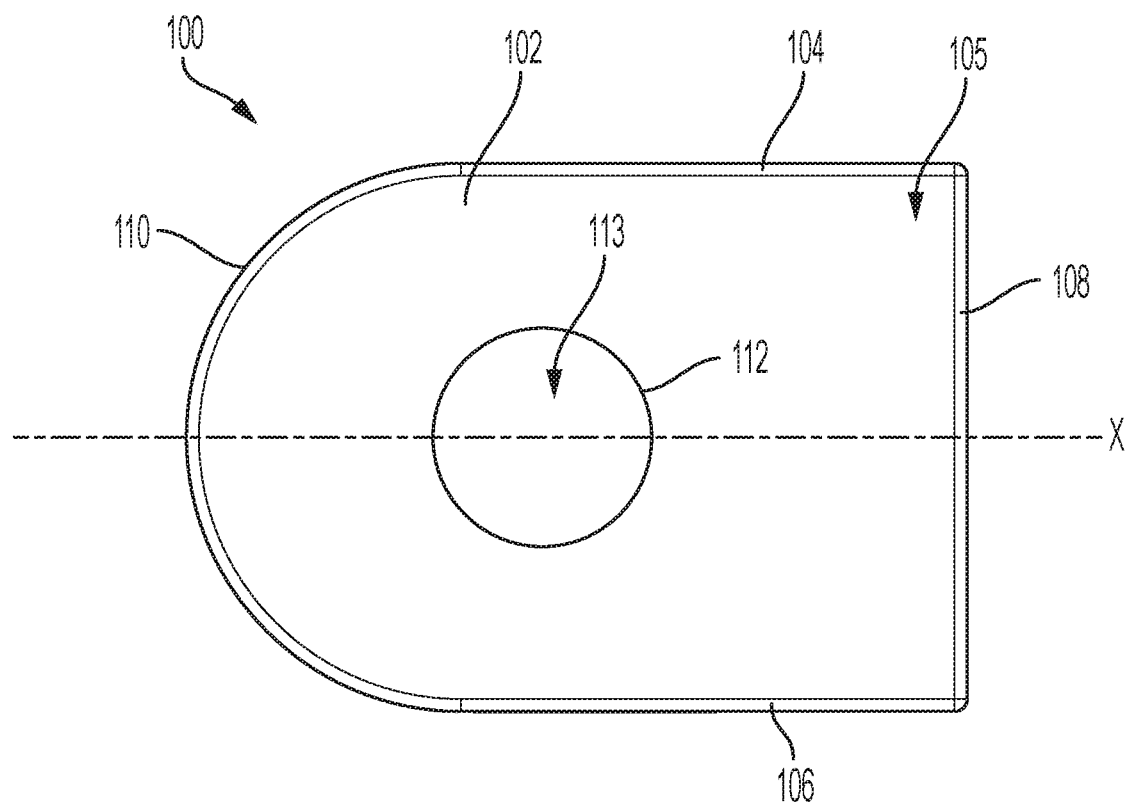
FIG. 1 is a schematic top view of a spacer and clip device, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Embodiments discussed herein include a combination spacer and clip device that is self-retained to a sheet metal or other component. The spacer and clip device includes an opening configured to accommodate a mechanical fastener, such as a bolt or screw, for mechanical retention of two components while also providing clamp load and setting a standoff distance between the two components. The spacer and clip device is removable when the mechanical fastener is removed, allowing for serviceability of the seal or other components.

Figure 2:
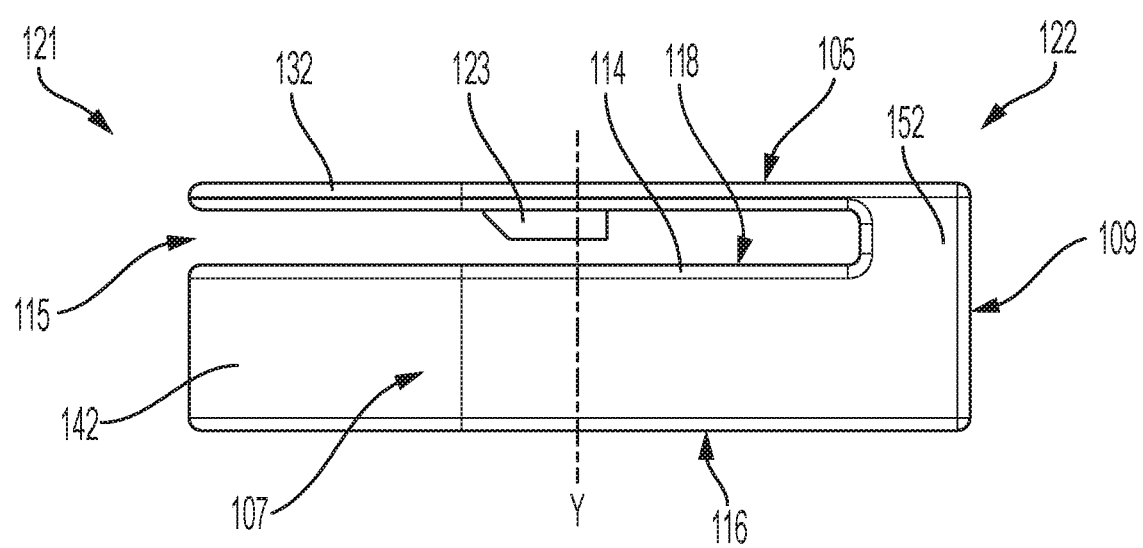
FIG. 2 is a schematic side view of the spacer and clip device of FIG. 1, according to an embodiment.
Figure 3:
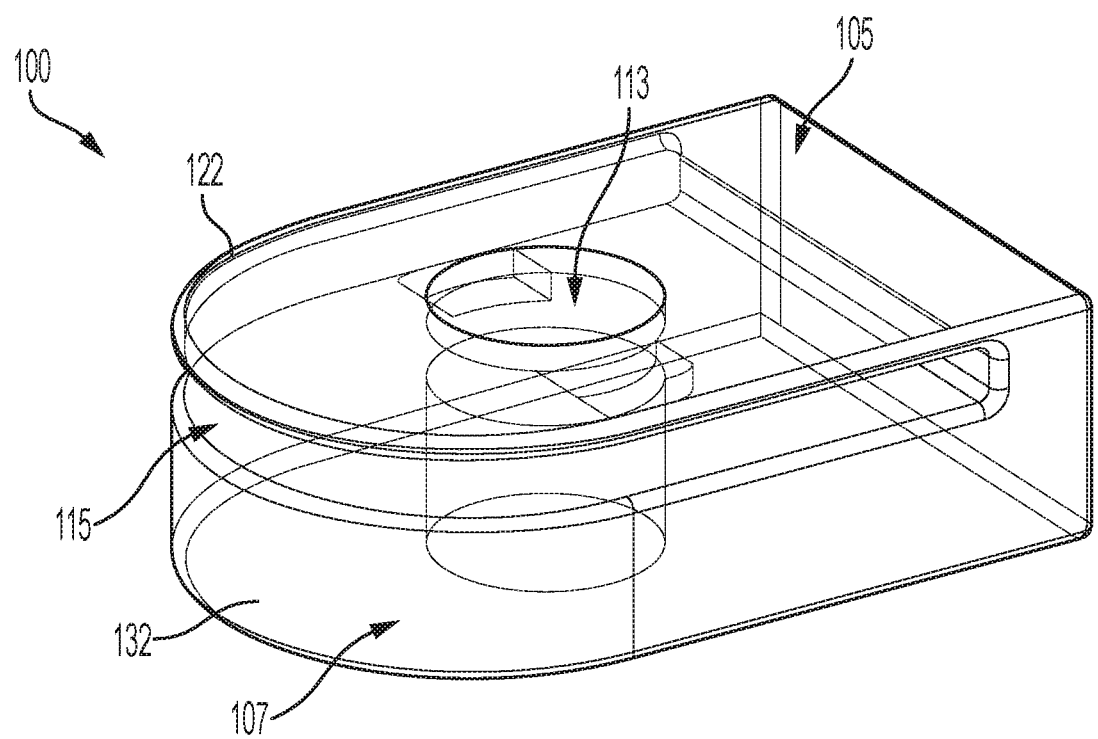
FIG. 3 is a schematic front perspective view of the spacer and clip device of FIG. 1, according to an embodiment.

FIGS. 1-3 illustrate a spacer and clip device 100, according to an embodiment of the disclosure. The spacer and clip device 100 includes a body 102. The body 102 includes a space configured to receive a sheet metal component or a component made from another rigid material such that a portion of the body 102 is on one side of the sheet metal component and a second portion of the body 102 is on the opposite side of the sheet metal component. A channel edge 114 defines a U-shaped channel 115. The channel 115 extends longitudinally through the body 102 from a first end 121 of the body 102 to a second end 122. The channel 115 extends at least partially through the body 102 but does not completely bisect the body 102. The channel 115 divides the body 102 into a clip portion 132 and a spacer portion 142. The clip portion 132 and the spacer portion 142 are connected at the second end 122 of the body 102 by a joining portion 152. In various embodiments, the body 102 is formed from a single piece of material, such as a rigid plastic, rubber, or other composite material having both strength and flexibility properties.

The clip portion 132 has a smaller longitudinal height than the spacer portion 142 such that the clip portion 132 is more flexible than the spacer portion 142. The clip portion 132 includes a first edge 104, a second edge 106 spaced apart from and parallel to the first edge 104, and a third edge 108 connecting the first and second edges 104, 106. The first and second edges 104, 106 extend parallel to a longitudinal axis X of the body 102. The third edge 108 extends perpendicular to the longitudinal axis X. The clip portion 132 also includes a curved edge 110 opposite the third edge 108. The curved edge 110 defines the first end 121 of the body 102 and the third edge 108 defines the second end 122 of the body 102, opposite the first end 121. The curved edge 110 also connects the first and second edges 104, 106.

The first, second, third, and curved edges 104, 106, 108, 110 define an upper clip surface 105. An attachment edge 112 is defined in the upper clip surface 105 to define an attachment opening 113 that extends laterally through the body 102.

With reference to FIG. 2, a retention member 123 extends laterally from an underside of the clip portion 132 inward into the channel 115. In various embodiments, the retention member 123 is a tab. The retention member 123 is configured to be received within a hole or opening in a sheet metal component. The retention member 123 provides additional spacing and retention features for the spacer and clip device 100.

With continued reference to FIG. 2, the spacer portion 142 includes a curved surface 107, a side surface 109, a lower surface 116, and an upper spacer surface 118. The side surface 109 is adjacent to the curved surface 107. The upper spacer surface 118 extends longitudinally from the first end 121 of the spacer portion 142 within the channel 115. The upper spacer surface 118 is approximately parallel to the clip portion 132. Each of the curved and side surfaces 107, 109 are parallel to a lateral axis Y of the body 102. Additionally, each of the curved surface 107 and the side surface 109 are perpendicular to the upper clip surface 105 and the upper spacer surface 118. The side surface 109 is adjacent to and contiguous with the upper clip surface 105 and the lower surface 116. The lower surface 116 is parallel to and spaced apart from the upper spacer surface 118 and the upper clip surface 105.

As shown in FIG. 3, the attachment opening 113 extends through both the clip portion 132 and the spacer portion 142 of the body 102. The attachment opening 113 is configured to receive a mechanical fastener, such as a screw or bolt, to provide mechanical retention of the spacer and clip device 100 and also to provide clamp load and set a standoff distance between two components, as discussed herein.

Figure 4:
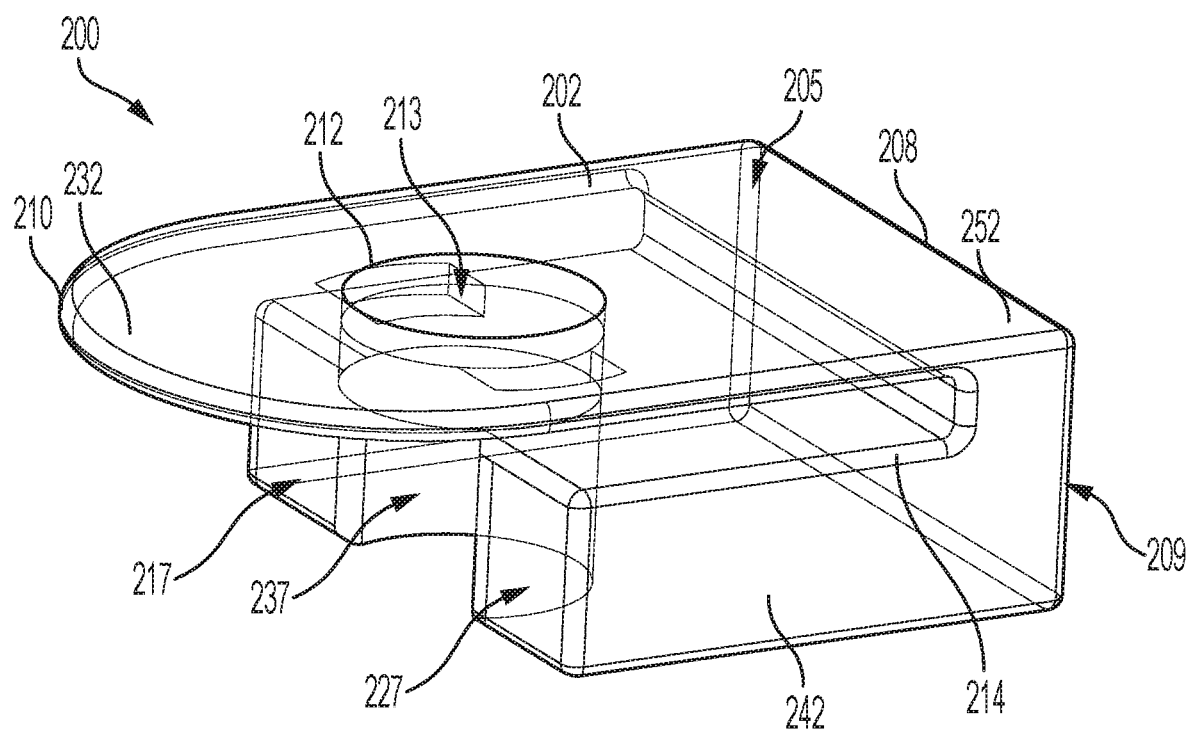
FIG. 4 is a schematic front perspective view of another spacer and clip device, according to an embodiment.
Figure 5:
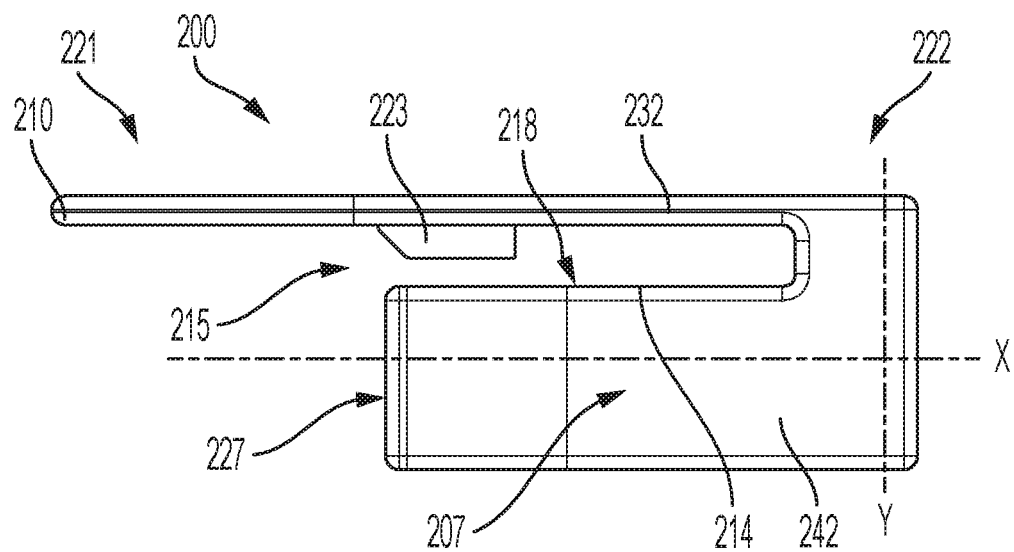
FIG. 5 is a schematic side view of the spacer and clip device of FIG. 4, according to an embodiment.

Another embodiment of a spacer and clip device 200 is shown in FIGS. 4 and 5. The spacer and clip device 200 includes a body 202. The body 202 includes a space configured to receive a sheet metal component or a component made from another rigid material. A channel edge 214 defines a U-shaped channel 215. The channel 215 extends longitudinally through the body 202 from the first end 221 of the body 102 to the second end 222. The channel 215 extends at least partially through the body 202 but does not complete bisect the body 202. The channel 215 divides the body 202 into a clip portion 232 and a spacer portion 242. The clip portion 232 and the spacer portion 242 are connected at the second end 222 of the body 202 by a joining portion 252. In various embodiments, the body 202 is formed from a single piece of material, such as a rigid plastic, rubber, or other composite material having both strength and flexibility properties.

The clip portion 232 of the body 202 is formed similar to the clip portion 132 of the spacer and clip device 100. A curved edge 210 defines a first end 221 of the body 202 and an edge 208 defines a second end 222 of the body 202 opposite the first end 221. The body 202 includes an upper clip surface 205. An attachment edge 212 is defined in the upper clip surface 205 to define an attachment opening 213 that extends through the body 202. A side surface 209 is adjacent to the upper clip surface 205 and extends laterally at the second end 222 of the body 202.

A retention member 223 extends from the clip portion 232 inward into the channel 215. In various embodiments, the retention member 223 is a tab. The retention member 223 is configured to be received within a hole or opening in a sheet metal component. The retention member 223 provides additional spacing and retention features for the spacer and clip device 200.

The clip portion 232 of the spacer and clip device 200 is similar in shape to the clip portion 132 of the spacer and clip device 100. However, as shown in FIGS. 4 and 5, in some embodiments, the spacer portion 242 may be cut or truncated as shown, depending on the installation position and spacing and packaging requirements of the spacer and clip device 200. The spacer portion 242 of the body 202 includes a first face surface 217, a second face surface 227, a receiving surface 237 connecting the first and second face surfaces 217, 227, and an upper spacer surface 218. The receiving surface 237 is a curved surface that aligns with the attachment opening 213.

As shown in FIG. 4, the attachment opening 213 extends through the clip portion 232 and aligns with the receiving surface 237 of the spacer portion 242 of the body 202. The attachment opening 213 is configured to receive a mechanical fastener, such as a screw or bolt, to provide mechanical retention of the spacer and clip device 200 and also to provide clamp load and set a standoff distance between two components, as discussed herein.

Figure 6:
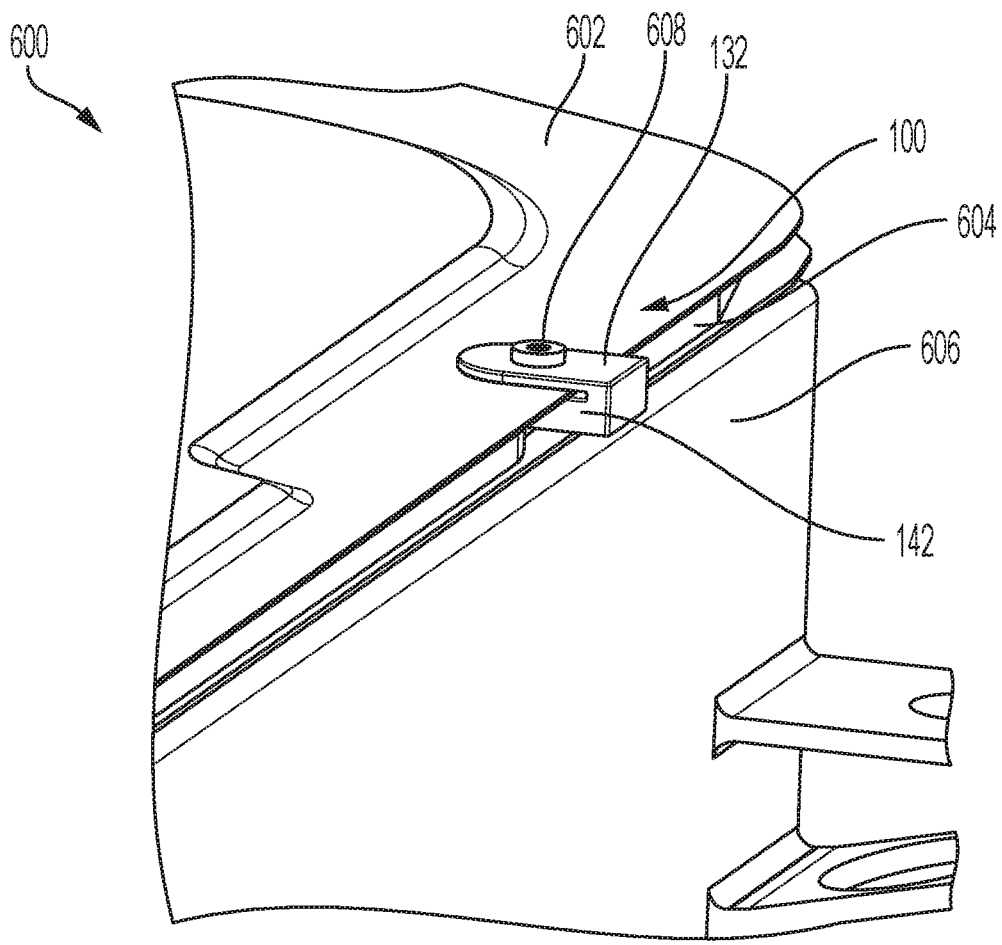
FIG. 6 is a schematic partial top perspective view of a spacer and clip device as part of a component assembly, according to an embodiment.
Figure 7:
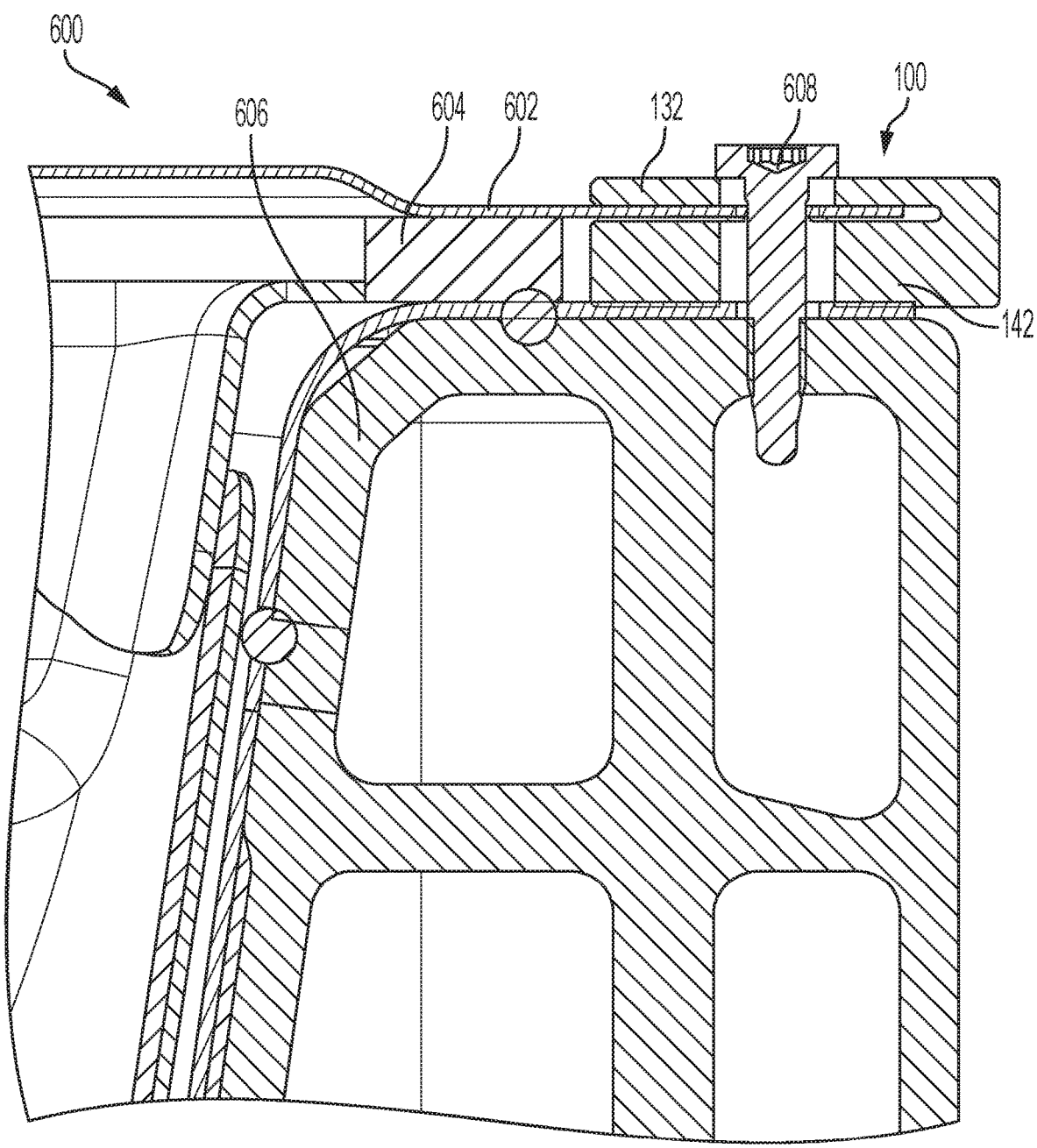
FIG. 7 schematic side cross-sectional view of the component assembly of FIG. 6, according to an embodiment.

FIGS. 6 and 7 illustrate the spacer and clip device 100 assembled with a component assembly 600 including various components, such as, for example, a cover, a sealing, and a joined component. In various embodiments, the component assembly 600 includes components such as a cover, sealing member, and battery tray for a battery tray component. The spacer and clip device 100 is inserted on a side of the component assembly 600 such that a cover 602 fits within the channel 115 of the spacer and clip device 100. The clip portion 132 is adjacent to and extends over a portion of an exterior surface of the cover 602. The retention member of the spacer and clip device 100 fits within an opening in the cover 602 to locate and initially secure the spacer and clip device 100 to the cover 602. A mechanical fastener 608 extends through the attachment opening in the spacer and clip device 100 to join the cover 602 and a joined component 606, which is, in some embodiments, a battery tray.

The spacer portion 142 of the spacer and clip device 100 is adjacent to a sealing member 604. In various embodiments, the sealing member 604 is a seal, such as a urethane seal. The spacer portion 142 is configured to set a specific spacing, or gap, between the cover 602 and the joined component 606. In various embodiments, the spacer portion 142 sets the seal height of the sealing member 604. Tightening or loosening the mechanical fastener 608 establishes a desired spacing between the two joined components. Removable of the mechanical fastener 608 allows the spacer and clip device 100 to be removed from the assembly 600 to allow access to the sealing member 604. The spacer and clip device 100 can be reinserted and reused.

While FIGS. 6 and 7 illustrate the assembly 600 with the spacer and clip device 100, it is understood that in other embodiments, the spacer and clip device 200 is used to accommodate packaging or other constraints.

In various embodiments, the spacer and clip devices 100, 200 are formed from a rigid but compressible material such as plastic or dense rubber. The spacer and clip devices 100, 200 are rigid to provide effective coupling between the two joined components but compress under application of force due to tightening the mechanical fastener to a desired standoff height. The spacer and clip devices 100, 200 are self-retaining to a first component, removable for service when the mechanical fastener is removed, and reusable.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fail within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A spacer and clip device, comprising:
  a body having a first end and a second end longitudinally opposite the first end, the body including:
    a channel edge defining a channel extending longitudinally through the body, the channel dividing the body into a clip portion and a spacer portion, the clip portion having a first edge, a second edge spaced apart from and parallel to the first edge, a curved edge connecting the first and second edges at the first end of the body, and a third edge connecting the first and second edges at the second end of the body with an upper clip surface defined by the first, second, third, and curved edges and the spacer portion having a side surface, a lower surface, and an upper spacer surface that extends from the first end of the body to the second end of the body, wherein the upper clip surface of the clip portion and the upper spacer surface of the spacer portion extend to a lateral plane positioned at the first end of the body; and
    an attachment edge defining an attachment opening that extends laterally through the clip and spacer portions of the body;
  wherein the spacer portion establishes a standoff height and the body is compressible to adjust the standoff height.

2. The spacer and clip device of claim 1 further comprising a retention member extending from the clip portion of the body into the channel.

3. The spacer and clip device of claim 1 wherein the clip portion and the spacer portion are coupled together by a joining portion.

4. The spacer and clip device of claim 3, wherein the joining portion extends from the upper clip surface to the lower surface of the spacer portion.

5. The spacer and clip device of claim 1, wherein the channel extends from the first end of the body to the second end of the body but does not bisect the body.

6. A spacer and clip device, comprising:
  a body including a clip portion and a spacer portion separated by a channel edge defining a channel extending longitudinally through the body, the clip portion and the spacer portion connected by a joining portion, the spacer portion including an upper spacer surface that extends longitudinally from a first end of the body to a second end of the body and the clip portion including an upper clip surface that extends longitudinally from the first end of the body to the second end of the body;
  wherein the spacer portion includes a first face surface, a second face surface, a receiving surface, and an upper spacer surface perpendicular to each of the first face, the second face, and the receiving surfaces, the first face, second face, and receiving surfaces truncating the spacer portion such that the upper spacer surface does not extend to a lateral plane positioned at the first end of the body, the body includes an attachment edge defining an attachment opening that extends laterally through the body, the receiving surface aligns with the attachment opening in the body, the spacer portion establishes a standoff height, and the body is compressible to adjust the standoff height.

7. The spacer and clip device of claim 6 further comprising a retention member extending from the clip portion of the body into the channel.

8. The spacer and clip device of claim 6, wherein the channel extends from a first end of the body to a second end of the body but does not bisect the body.

9. A battery tray assembly, comprising:
  a cover member;
  a battery tray;
  a sealing member positioned between the cover member and the battery tray;

a spacer and clip device including a body having a first end and a second end longitudinally opposite the first end, the body including a clip portion and a spacer portion separated by a channel edge defining a channel extending longitudinally through the body, the clip portion and the spacer portion connected by a joining portion, the body including an attachment edge defining an attachment opening that extends laterally through both of the clip portion and the spacer portion; and a mechanical fastener;

wherein the mechanical fastener extends through the attachment opening in the spacer and clip device to removably couple the cover member and the battery tray, the clip portion of the spacer and clip device extends over an outward surface of the cover member, and the spacer portion of the spacer and clip device is adjacent to the sealing member and establishes a spacing between the cover member and the battery tray.

10. The battery tray assembly of claim 9, wherein the clip portion includes an upper clip surface and the spacer portion includes an upper spacer surface and both of the upper clip surface and the upper spacer surface extend to a lateral plane positioned at the first end of the body.

11. The battery tray assembly of claim 9, wherein the spacer portion includes a first face surface, a second face surface, a receiving surface, and an upper spacer surface perpendicular to each of the first face, second face, and receiving surfaces, the first face, second face, and receiving surfaces truncating the spacer portion such that the upper spacer surface does not extend to a lateral plane positioned at the first end of the body.

* * * * *